INVENTOR.
REINHOLD A. PEARSON
BY
ATTYS.

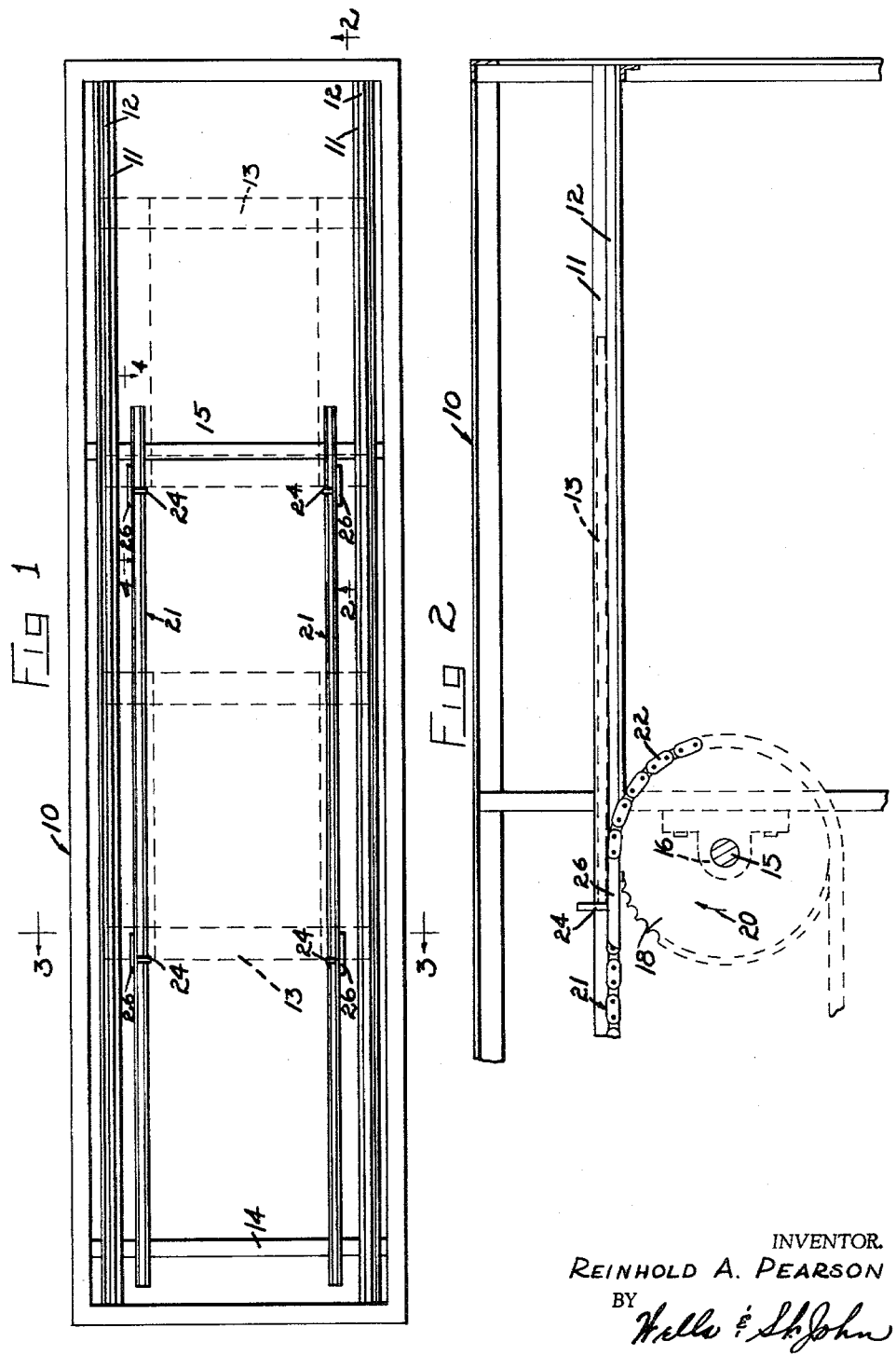

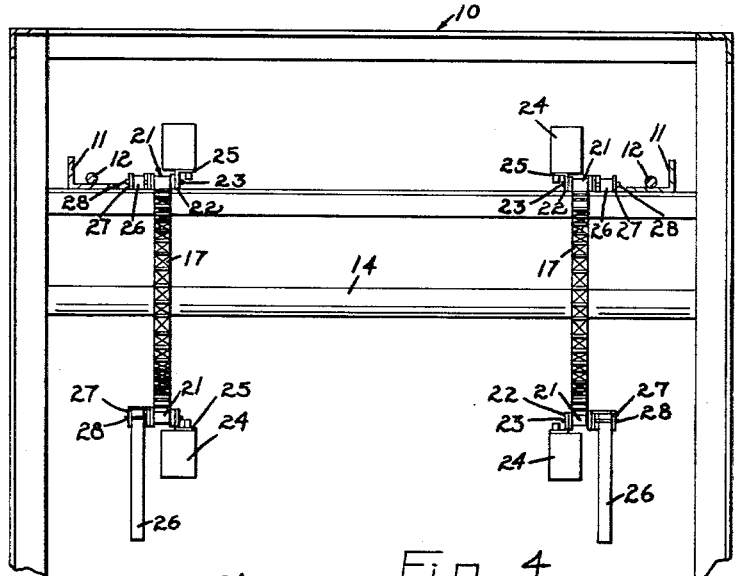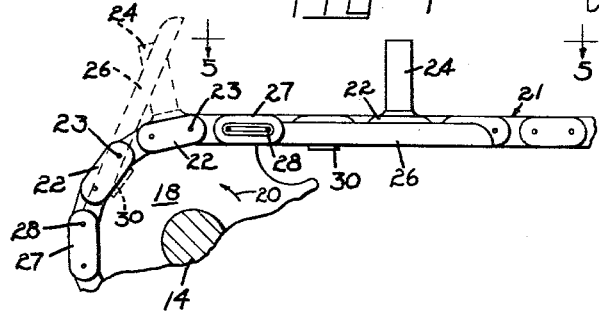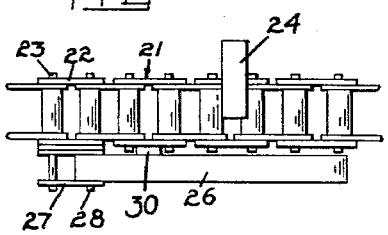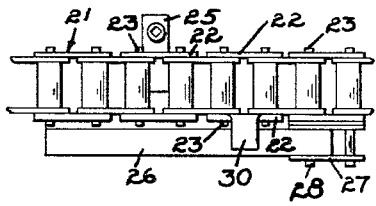

United States Patent Office 3,184,033
Patented May 18, 1965

3,184,033
CONVEYOR AND ARTICLE DISCHARGE
MECHANISM
Reinhold A. Pearson, Spokane, Wash., assignor to
R. A. Pearson Co., Spokane, Wash.
Filed Sept. 26, 1963, Ser. No. 311,776
4 Claims. (Cl. 198—27)

This is a continuation-in-part of application Ser. No. 218,023, filed August 20, 1962, for "Carton Setting Up Machine," now abandoned.

The present invention is concerned with an improvement in conveyors designed to carry relatively thin flat articles along upper conveyor flights in generally longitudinal directions.

The present invention is concerned with a device for carrying thin articles on a conveyor, the particular article for which the conveyor was designed being flat carton blanks. The instant conveyor is designed to be incorporated in a machine for setting up cartons, such as that disclosed in my co-pending patent application entitled "Carton Setting Up Machine," filed concurrently with this application, Ser. No. 313,408.

It is a first object of this invention to provide a novel conveyor arrangement utilizing upright lugs mounted on conveyor chains and adapted to push relatively thin flat articles, including means to positively locate the deposited location of the articles relative to the supporting framework of the conveyor.

Another object of this invention is to eliminate the tendency of upright lugs to catch upon the ends of an article being deposited at the terminal end of a conveyor as the lugs come downward over the terminal sprocket.

These and further objects will be evident from a study of the following disclosure taken in conjunction with the accompanying drawings, which illustrate a preferred form of the invention. It is to be understood that this form is merely illustrative, and that the details of the machine within which the conveyor might be incorporated have not been included in this application. The drawings are limited to a disclosure of the conveyor, and illustrate two embodiments of the invention.

In the drawings:

FIGURE 1 is a top plan view of a conveyor framework and the instant conveyor;

FIGURE 2 is an enlarged fragmentary sectional view taken along line 2—2 in FIGURE 1;

FIGURE 3 is an enlarged fragmentary sectional view taken along line 3—3 in FIGURE 1;

FIGURE 4 is an enlarged fragmentary sectional view taken along line 4—4 in FIGURE 1;

FIGURE 5 is a fragmentary top view of the lug assembly as seen along line 5—5 in FIGURE 4;

FIGURE 6 is a bottom view of the assembly seen in FIGURE 5;

Figure 7:
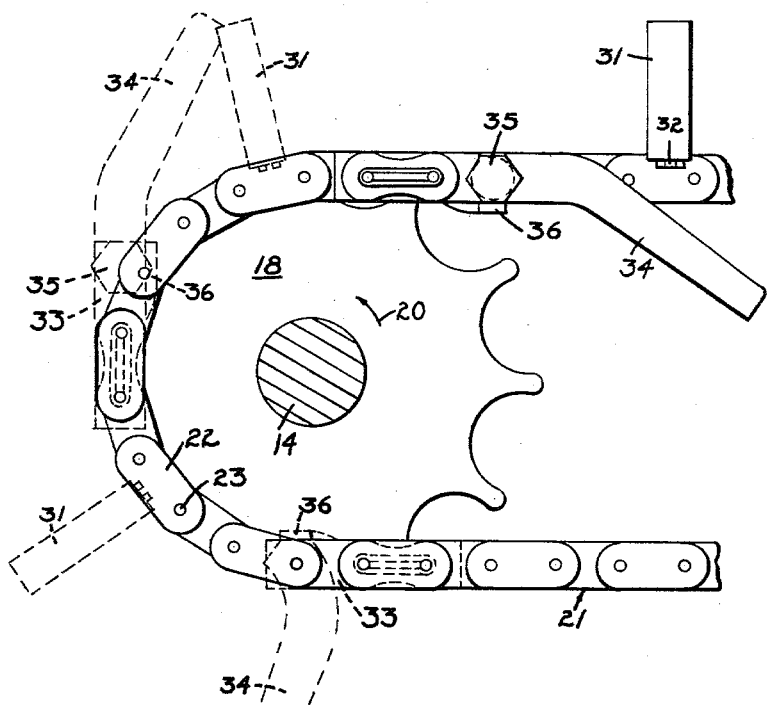
FIGURE 7 is a view similar to FIGURE 4 illustrating a second form of the invention.

The present conveyor was designed particularly for a box or carton setting up machine, of the type that feeds flattened carton blanks to a working station at which station the carton is successively folded to present the desired rectangular box configuration. In such an operation it is imperative that the carton blank be accurately placed at the terminal end of the conveyor relative to the supporting framework and relative to the apparatus that effects the necessary bending of its scored edges. Should the carton be inaccurately placed, improper folding of the carton will result and the carton will not be acceptable.

In the generalized conveyor shown in FIGURE 1 are utilized two transversely spaced sprocket chains with upwardly protruding lugs that carry the carton blanks along the upper flight of the horizontal conveyor presented thereby. The blanks are brought downward upon the conveyor, and rest along the sides of the framework as well as on the conveyor chains themselves. The blanks are carried by the chains and lugs to the terminal end of the conveyor, where the lugs travel downwardly over the terminal sprockets. It is at this point that trouble occurs with the use of such lugs, since they must extend above the relatively thin blank, and therefore have a serious tendency to catch upon the rear edge of the blank and to thereby either damage the blank or disturb its proper placement relative to the framework.

In the drawings there is generally shown a rectangular supporting framework 10 that extends longitudinally the full length of the conveyor apparatus. The framework 10 supports longitudinal guides 11 which are simply conventional angle irons having a rod 12 fixed to each and extending along the full length thereof. The transverse positions of the guides 11 relative to the framework 10 is such that the side edges of a carton blank 13 will rest along the rods 12. The carton blanks 13 presumably are dropped onto the rods 12 adjacent the left hand end of the conveyor as seen in FIGURE 1. The manner by which such placement is effected has no bearing on the instant invention and will not be described herein.

The conveyor itself comprises a rear shaft 14 and a front shaft 15, each of which is suitably journalled in bearings mounted on the framework 10, an example of such a bearing shown in dashed lines in FIGURE 2 and designated by the numeral 16. The rear shaft 14 has fixed thereto a pair of sprockets 17 (FIGURE 3) and the front shaft 15 has fixed thereto a pair of sprockets 18 (FIGURE 2). One of the shafts 14 or 15 is operatively driven by a motor or other drive means (not shown), the conveyor being driven in the direction illustrated by the arrow 20 in FIGURE 2, so that the upper flight of the conveyors moves from left to right in FIGURES 1 and 2.

Entrained about the sprockets 17 and 18 are two conventional endless roller chains 21. Each chain is identical and is in an identically timed relationship relative to the other. Each of the chains 21 is made of individual chain elements 22 which are pivoted about pins 23 in the usual fashion. Mounted along the length of the chains 21 are a plurality of upright lugs 24 which serve to push the carton blanks 13 relative to the framework 10. The lugs 24 are simply fastened to a single chain element 22 by means of a bracket 25. The height of the lugs 24 is such that the lugs 24 will normally protrude beyond the top of the carton blanks 13 being pushed thereby, so that the proper engagement of carton blanks 13 will be insured regardless of slight bending or other non-uniform characteristics that might be found in particular carton blanks 13.

Mounted alongside each of the lugs 24 is a lever 26 which is pivotally connected to the chain 21 by means of an extension bracket 27 fixed to a chain element 22 that is located forward of the lug 24 in the direction of travel of the chain 21. The lever 26 is freely pivoted about its axis 28, and extends rearwardly beyond the lug 24. The terminal end of the lever 26 extends a radial distance from axis 28 greater than the maximum radial distance to the upper end of the lug 24 from axis 28. The lever 26 normally rests upon a stop 30 that extends transversely outward from the chain 21 which is fixed to a chain element 22 intermediate bracket 27 and lug 24. Thus, as the chain 21 is brought downwardly over the sprocket 18, the stop 30 will pivot the lever 26 upwardly relative to the lug 24 and will cause the lever 26 to push forwardly on carton blanks contacted previously only by the lug 24, thereby protecting the blanks from engagement by the upper edge of the lug 24, and insuring even and accurate placement of each carton blank 13 due to the smooth engaging forward surface of the lever 26. This action is believed to be evident from the dashed line showing in FIGURE 4.

Basically then, the present device contemplates a lever 26 mounted on the chain 21 about an axis forward of the lug 24, and engageable with a stop 30 that limits rotational movement of the lever 26 in a direction opposite to the intended rotational direction of the sprocket about which it must travel downward. The length of the lever 26 must extend radially beyond the radial distance from the lever axis 28 to the rear top edge of the lug 24, so that the lever 26 can push the carton blanks 13 completely beyond engagement by the top edge of the lug 24 as the lug 24 comes downwardly over sprockets 18.

As the lugs 24 and the levers 26 travel along the lower flights of the chains 21 the levers 26 hang freely downward and can freely pivot rearwardly so as to clear any obstructions on frame 10 that might be encountered. The levers 26 will resume their position as shown in FIGURE 4 when they have come upwardly over the rear end sprockets 17.

Figure 8:
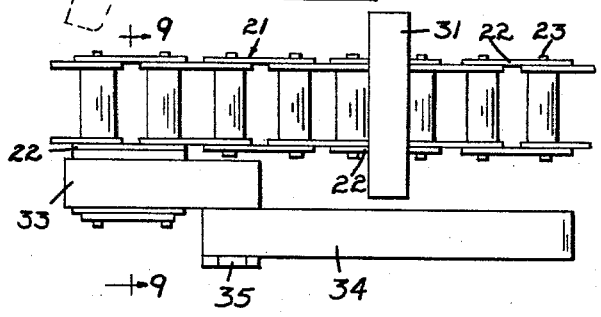
FIGURE 8 is a top view of the second form of the invention.
Figure 9:
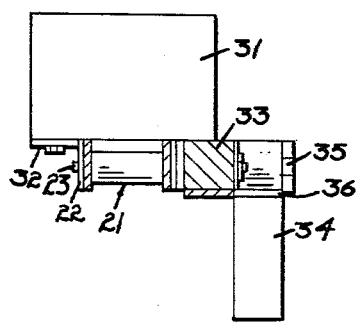
FIGURE 9 is a sectional view taken along line 9—9 in FIGURE 8.

In FIGURES 7, 8, and 9 is shown a slightly modified form of this same invention, utilizing the same chain 21 and chain elements 22 as well as the pins 23. In this instance, the lugs 31 are somewhat wider than those previously disclosed, although this is a design feature that is not of great importance to the practice of the instant invention. The lugs 31 are fastened to the chain 21 by means of side brackets 32 which connect to a single chain element 22.

Mounted forwardly of the chain element 22 that carries the lug 31 is a bracket 33 fixed to a second chain element 22 and pivotally carrying a bent lever 34. The lever 34 is carried about a pivot axis formed by a bolt 35, and is limited in its rotational movement opposite to the intended rotational movement of sprocket 18 by means of a transversely protruding stop 36. The stop 36 is located directly below the pivotal connection of the lever 34 on the bracket 33, although it is obvious that its position could be in many locations with equal effectiveness, since its sole purpose is to maintain the lever 34 at a location below the chain 21 and to cause the lever 34 to pivot relative to lug 31 as lever 34 travels downwardly over the front end of sprocket 18, as can be seen in dashed lines in FIGURE 7.

The operation and theory of both of these embodiments of the invention is identical, and is believed to be evident from the foregoing discussion and the accompanying drawings. The bent configuration of lever 34 as shown in FIGURES 7 through 9 presents a somewhat smoother contact with the carton edge, although in practice it has been found that this is not absolutely necessary.

With the use of the foregoing arrangement, I have been able to accurately position carton blanks along the rods 12 in a machine designed to set up such blanks into a box form. The smooth pushing action of the levers 26 or 34 results in accurate placement of each box blank relative to the framework 10, so that supporting machinery can then be utilized in high speed operations to accurately bend or fold the boxes as desired. The use of the levers 26 or 34 prevents engagement by the lugs 24 or 31 which would disturb the desired positioning of the carton blanks 13 and which often results in damage to the carton blanks 13 or to other portions of the machinery.

Various other modifications might be made in this basic construction without deviating from the scope of this invention, and therefore only the following claims are intended to limit or restrict the field of invention which I have defined.

Having thus described my invention, I claim:

1. A conveyor comprising:
   a rigid supporting framework;
   first and second transversely spaced endless roller chains entrained about longitudinally spaced pairs of terminal sprockets rotatably mounted on said framework to thereby form respective upper and lower flights of said chains, said chains being each constructed of pivotally interconnected chain elements joining successive pivot pins, the respective sprockets carrying said chains being operatively interconnected for conjoint rotation relative to said framework;
   a pair of transversely aligned lugs fixed respectively to corresponding first chain elements of each chain and protruding perpendicularly outward therefrom in upright directions along the upper chain flights;
   a pair of longitudinal levers pivoted respectively to corresponding second chain elements of said chains about coaxial axes parallel to the chain pivot pins and located forwardly of said first chain elements in the intended direction of motion of said chains, said levers extending respectively alongside said lugs a radial distance relative to their respective axes in excess of the maximum radial distance between said lugs and said axes; and
   stop means fixed relative to one chain element of each of said chains in the pivotal paths of movement of said levers about their respective axes adapted to restrict pivotal motion of said levers in a rotational direction opposite to the intended rotational direction of motion of said sprockets and to support said levers at positions along the chain upper flights wherein said levers are below the top edges of said lugs.

2. In combination with a conveyor comprised of an endless roller chain entrained about a pair of terminal sprockets rotatably carried on a fixed supporting framework;
   an outwardly protruding rectangular lug fixed to a first element of the chain and extending perpendicularly therefrom in a plane parallel to the individual sprocket axes;
   a lever pivotally carried about in an axis parallel to the sprocket axes by a second element of the chain located forwardly of the first element in the direction of movement of said elements, said lever being extended alongside said lug a radial distance from its axis greater than the maximum radial distance from said axis to said lug; and
   means fixed to said chain in the path of movement of said lever adapted to limit pivotal movement of said lever in a rotational direction opposite to that of the sprockets.

3. A conveyor comprising a framework;
   a pair of aligned sprockets mounted for rotation about parallel spaced axes on said framework;
   endless roller chain comprising a plurality of linked chain elements entrained about said sprockets;
   a lug fixed to a first element of said chain and projecting outwardly therefrom;
   a bracket mounted on said chain forward of said lug in the intended direction of motion of the chain, said bracket being fixed to a single chain element;
   a lever pivotally mounted on said bracket about an axis parallel to the sprocket axes, said lever extending rearwardly alongside the lug a radial distance relative to its axis greater than the maximum radial distance between the lug and said axis, said lever having a smoothly contoured upwardly facing surface along the upper flight of said chain, and
   stop means carried by said chain in the path of pivotal motion of said lever about said lever axis, said stop means being adapted to restrict pivotal motion of the lever about said lever axis in a direction of rotation opposite to the intended direction of rotation of said sprockets.

4. In combination with a conveyor comprising an endless roller chain entrained about a pair of terminal sprockets rotatably journalled on a fixed supporting framework:

a lug fixed to a first chain element extending radially outward therefrom as the chain passes over said sprockets;

a lever pivotally carried on said chain at one side thereof about a lever axis that is parallel to the sprocket axes, said lever axis being located forwardly of said lug in the intended direction of motion of said chain and being of a radial length relative to said lever axis greater than the maximum radial separation of said lug relative to said lever axis;

and means fixed to said chain protruding transversely across the rotational path of said lever about said lever axis adapted to limit pivotal movement of said lever in a rotational direction opposite to that of the intended rotational direction of said sprockets.

References Cited in the file of this patent
UNITED STATES PATENTS
2,501,473    Malvicini _____ Mar. 21, 1950